(12) United States Patent
Masahiko et al.

(10) Patent No.: US 9,739,959 B2
(45) Date of Patent: Aug. 22, 2017

(54) OPTICAL TRANSMISSION APPARATUS

(71) Applicant: FUJITSU LIMITED, Kawasaki-shi, Kanagawa (JP)

(72) Inventors: Kondo Masahiko, Fukuoka (JP); Koji Kano, Fukuoka (JP); Yoshiaki Tobimatsu, Fukuoka (JP); Takahisa Yoshizumi, Fukuoka (JP); Kazuya Satoh, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/975,375

(22) Filed: Dec. 18, 2015

(65) Prior Publication Data

US 2016/0202434 A1    Jul. 14, 2016

(30) Foreign Application Priority Data

Jan. 9, 2015    (JP) ................. 2015-003543

(51) Int. Cl.
  *G02B 6/42*    (2006.01)
  *G02B 6/38*    (2006.01)
  *G02B 6/32*    (2006.01)
  *H04B 10/50*   (2013.01)

(52) U.S. Cl.
  CPC ............ *G02B 6/4269* (2013.01); *G02B 6/32* (2013.01); *G02B 6/3893* (2013.01); *G02B 6/4257* (2013.01); *G02B 6/4261* (2013.01); *G02B 6/4292* (2013.01); *H04B 10/501* (2013.01); *G02B 6/4249* (2013.01)

(58) Field of Classification Search
  CPC .................................. G02B 6/4269
  See application file for complete search history.

(56) References Cited

U.S. PATENT DOCUMENTS

| 6,302,595 B1 * | 10/2001 | Vilgiate | G02B 6/32 |
| | | | 385/88 |
| 7,505,274 B2 * | 3/2009 | Yu | H01L 23/4006 |
| | | | 165/80.3 |
| 8,823,540 B2 * | 9/2014 | Scholeno | H01R 12/716 |
| | | | 340/815.4 |

FOREIGN PATENT DOCUMENTS

| JP | 3-23959 U | 3/1991 |
| JP | 2002-102164 | 4/2002 |

* cited by examiner

*Primary Examiner* — Omar R Rojas
(74) *Attorney, Agent, or Firm* — Fujitsu Patent Center

(57) ABSTRACT

An optical transmission apparatus includes a substrate and a heatsink. The substrate is a substrate on which multiple light sources and a heat generating part are mounted. The heatsink includes a base portion, a fin portion, and multiple light guiding paths. The base portion is arranged on a surface of the heat generating part on an opposite side to the substrate. The fin portion rises up from a surface of the base portion on an opposite side to the heat generating part. The multiple light guiding paths are formed inside the base portion, and guide lights emitted by the multiple light sources to multiple output destinations corresponding to the multiple light sources.

12 Claims, 17 Drawing Sheets

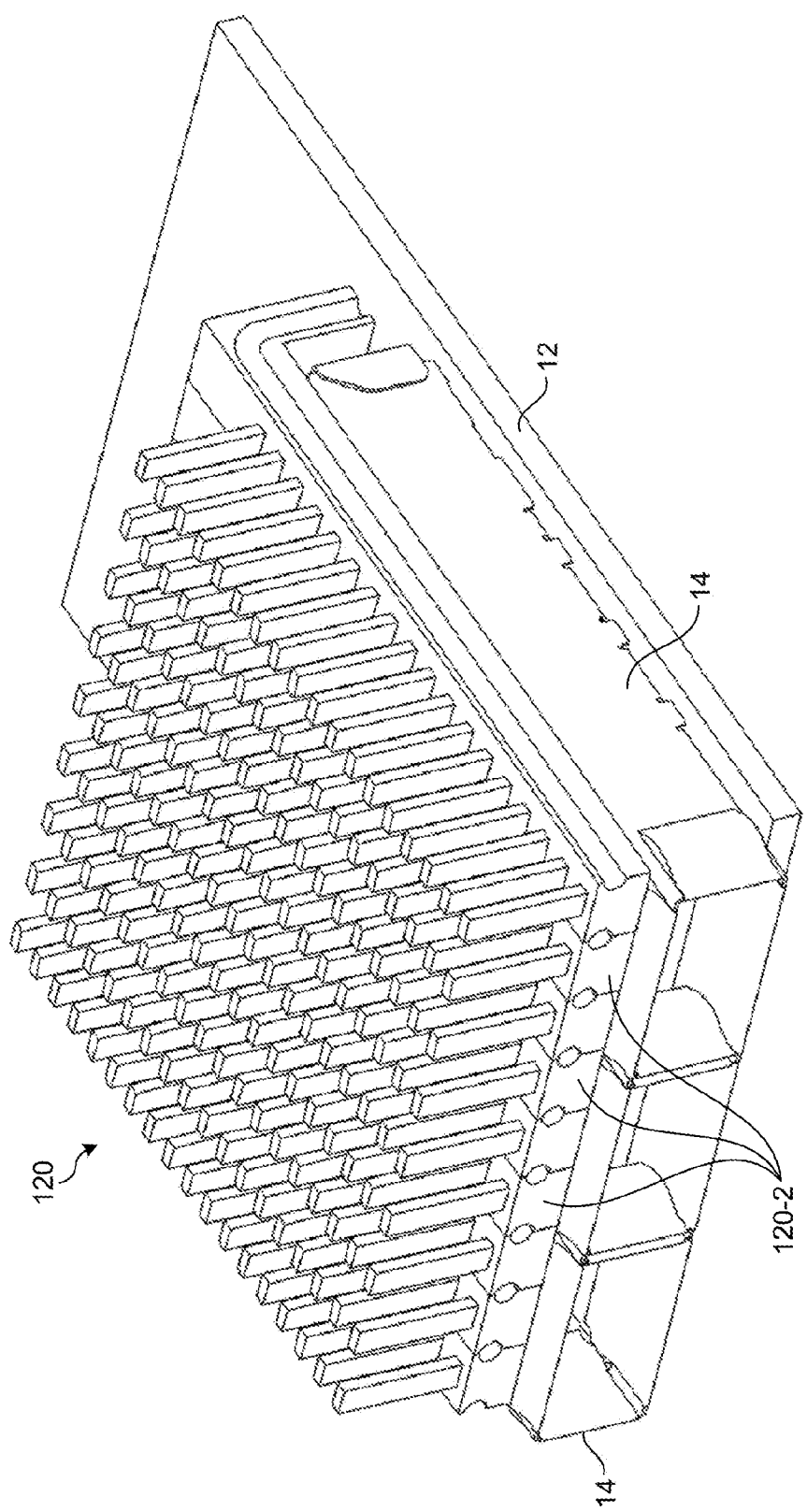

OPTICAL TRANSMISSION APPARATUS

CROSS-REFERENCE TO RELATED APPLICATION

This application is based upon and claims the benefit of priority of the prior Japanese Patent Application No. 2015-003543, filed on Jan. 9, 2015, the entire contents of which are incorporated herein by reference.

FIELD

The embodiments discussed herein are related to an optical transmission apparatus.

BACKGROUND

Conventionally, a light pipe has been used as a light guiding means to guide light emitted by a light source. For example, when multiple light sources are mounted on a substrate that is housed in a casing of an optical transmission apparatus, light pipes guide light emitted from the multiple light sources to corresponding destinations, respectively (Japanese Laid-open Patent Publication No. 2002-102164).

On an optical transmission apparatus, various kinds of heat generating parts are mounted on a substrate in addition to the light sources. As the heat generating parts, for example, a cage in which a pluggable module that is connected to an optical fiber to communicate optical signals is inserted, a processor, and the like are included. Temperature increase of a heat generating part causes deterioration of the performance of the heat generating part. To suppress the temperature increase of a heat generating part, it is preferable that a heatsink be provided in the heat generating part.

When a light pipe is applied to a structure providing a heatsink to a heat generating part, it is assumed that a light pipe is arranged between fins of the heatsink. However, in such a structure, the light pipe arranged between fins can disturb the flow of air. As a result, the heat dissipation efficiency can be deteriorated.

Moreover, in the structure in which light pipes are arranged between fins of a heatsink, by arranging a region to place a light pipe between fins, the number of fins can be reduced. Particularly, there is a trend to increase the number of light sources in recent years, and it is conceivable that the number of light pipes further increases with increase in the number of light sources. If the number of light pipes increases, the region to place the light pipes is expanded, and accordingly, the number of fins is further reduced. As a result, the heat dissipation efficiency can be further deteriorated.

On the other hand, for optical transmission apparatuses, miniaturization has been promoted. Therefore, if the number of light pipes increases, from the viewpoint of miniaturization of the apparatuses, it is conceivable that intervals between light pipes become narrow. As the interval between light pipes becomes narrower, it becomes more likely that lights leaked from adjacent light pipes interfere with each other. Such interference of light is undesirable because it causes deterioration of visibility of light.

When a light pipe is applied to the structure in which a heatsink is provided in a heat generating part, it can also be conceivable that adjacent light pipes are joined through a joint unit in the viewpoint of simplification of the installation. However, in the structure in which adjacent light pipes are joined through a joint unit, lights leaked from the adjacent light pipes through the joint unit can interfere with each other.

SUMMARY

According to an aspect of an embodiment, an optical transmission apparatus includes a substrate on which a plurality of light sources and a heat generating part are mounted; and a heatsink that includes a base portion that is arranged on a surface of the heat generating part on an opposite side to the substrate, a fin portion that rises up from a surface of the base portion on an opposite side to the heat generating part, and a plurality of light guiding paths that are formed inside the base portion and that guide lights emitted by the light sources to a plurality of output destinations, respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 depicts an application example of the heatsink of the second embodiment;

DESCRIPTION OF EMBODIMENTS

Preferred embodiments of the present invention will be explained with reference to accompanying drawings. The disclosed technique is not limited to the embodiments.

[a] First Embodiment

Figure 10:
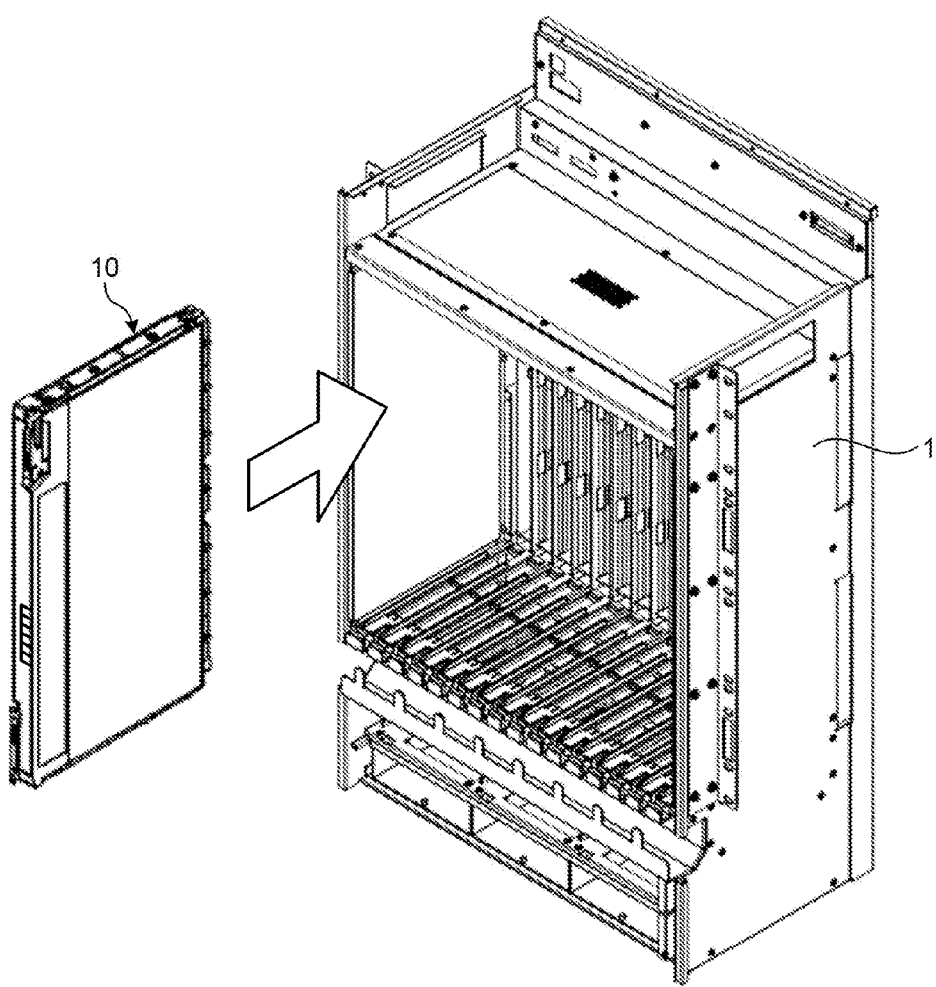
FIG. 10 is a diagram for explaining a use example of an optical transmission apparatus of a precursor technique.

First, a precursor technique of an optical transmission apparatus of a first embodiment is explained. FIG. 10 is a diagram for explaining a use example of an optical transmission apparatus of a precursor technique. As depicted in FIG. 10, an optical transmission apparatus 10 is inserted in a subrack 1. Thus, the optical transmission apparatus 10 is electrically connected to an electronic circuit arranged in the subrack 1. The optical transmission apparatus 10 is also called a "plug-in unit (PIU)".

Figure 11:
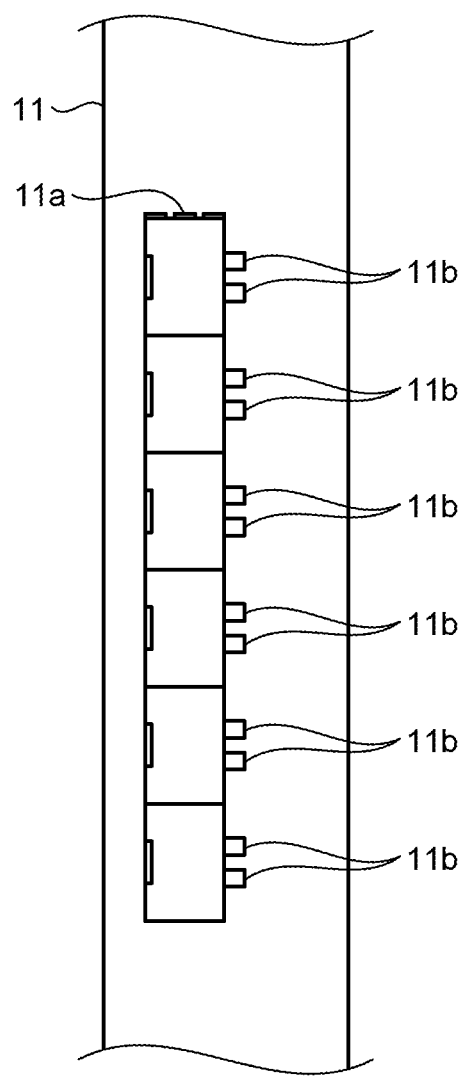
FIG. 11 is a front view depicting an external view of the optical transmission apparatus of the precursor technique on a side opposite to a subrack.

FIG. 11 is a front view depicting an external view of the optical transmission apparatus of the precursor technique on a side opposite to the subrack. As depicted in FIG. 11, in a casing 11 of the optical transmission apparatus 10, an insertion slot 11a to insert a pluggable type module (hereinafter, "pluggable module") that transmits and receives optical signals by connecting an optical fiber thereto is formed. Moreover, in the casing 11, multiple output holes 11b to output light indicating a condition of the optical transmission apparatus 10 to an external unit are formed. The output holes 11b correspond to multiple light sources 13 that are mounted on a substrate 12 inside the casing 11 described later, respectively, and output light emitted by the light sources to an external unit as light indicating a state of the optical transmission apparatus 10, respectively. The output holes 11b correspond to one example of multiple output destinations associated with the light sources.

Figure 12:
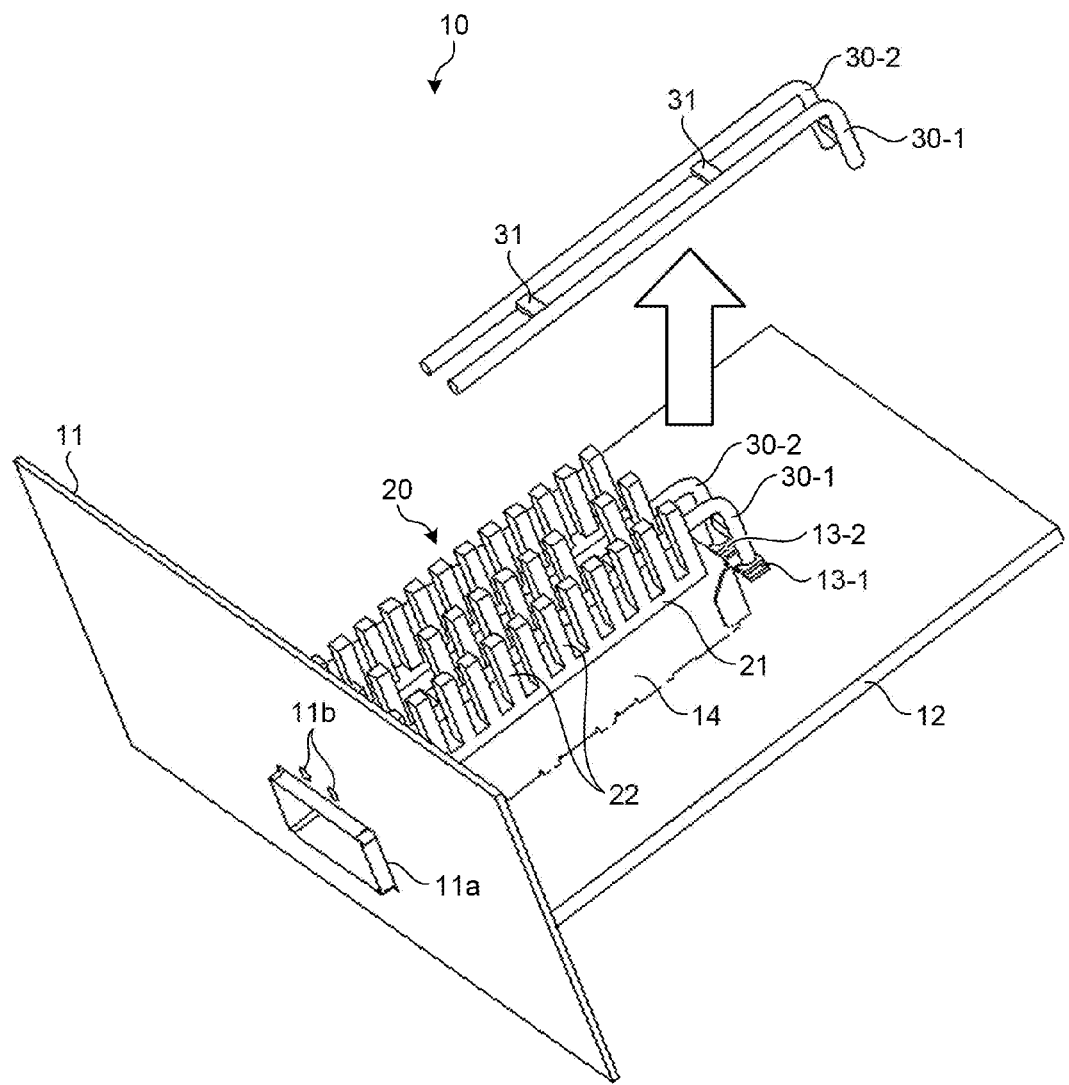
FIG. 12 depicts one example of an internal configuration of the optical transmission apparatus of the precursor technique.

FIG. 12 depicts one example of an internal configuration of the optical transmission apparatus of the precursor technique. In FIG. 12, an internal configuration of the optical transmission apparatus 10 when a single pluggable module is inserted to the insertion slot 11a of the casing 11 is explained as an example.

As depicted in FIG. 12, the optical transmission apparatus 10 includes the substrate 12 housed in the casing 11, a heatsink 20, and light pipes 30-1 and 30-2. In FIG. 12, for convenience of explanation, a state in which the light pipes 30-1 and 30-2 are removed is indicated by a white arrow.

On the substrate 12, the multiple light sources 13 (light sources 13-1, 13-2) are mounted. Although the number of the light sources 13 is two in this example, the number of the light sources 13 is not limited thereto. Each of the light sources 13-1 and 13-2 emits light indicating various kinds of conditions of the optical transmission apparatus 10. In the following, when the light sources 13-1 and 13-2 are not particularly distinguished, these light sources 13-1 and 13-2 may be called light source 13 collectively. Similarly, other components may be called collectively.

Furthermore, on the substrate 12, a cage 14 is mounted. An end portion of the cage 14 on a side opposite to the light source 13 is exposed from the insertion slot 11a of the casing 11. To the cage 14, a pluggable module is inserted. Thus, the pluggable module is electrically connected to a circuited printed on the substrate 12. The cage 14 generates heat by receiving heat generated by the pluggable module in a state in which the pluggable module is inserted in the cage 14. The cage 14 and the pluggable module inserted in the cage 14 are one example of a heat generating member.

The heatsink 20 includes a base portion 21 and fin portions 22. The base portion 21 is arranged on a surface opposite to the substrate 12. The fin portions 22 are arranged so as to rise up from a surface on an opposite side to the cage 14.

The light pipes 30-1 and 30-2 are arranged between the fin portions 22 in the heatsink 20, respectively. The light pipes 30-1 and 30-2 are formed with, for example, a material having translucency, such as clear transparent resin. The light pipes 30-1 and 30-2 guide lights emitted by the multiple light sources 13 to multiple destinations corresponding to the light sources 13, respectively. Specifically, the light pipe 30-1 guides light emitted by the light source 13-1 to the output hole 11b of the casing 11 corresponding to the light source 13-1. Moreover, the light pipe 30-2 guides light emitted by the light source 13-2 to the output hole 11b of the casing 11 corresponding to the light source 13-2.

Furthermore, the light pipes 30-1 and 30-2 are joined through a joint unit 31. The joint unit 31 is formed with a material having translucency, similarly to the light pipes 30-1 and 30-2.

A problem of the optical transmission apparatus 10 of the precursor technique is explained herein. In the optical transmission apparatus 10, the respective light pipes 30 are arranged between the fin portions 22, and therefore, there is a possibility that the respective light pipes disturb the flow of air. As a result, the heat dissipation efficiency can be deteriorated.

Moreover, in the optical transmission apparatus 10, there is a possibility that the number of the fin portions 22 is reduced by arranging regions to arrange the respective light pipes 30 between the fin portions 22. Particularly, there is a trend to increase the number of the light sources 13 in recent years, and it is conceivable that the number of light pipes 30 further increases with increase in the number of the light sources 13. If the number of the light pipes 30 increases, the region to arrange the light pipes 30 is expanded, and accordingly, the number of the fin portions 22 is further reduced. As a result, the heat dissipation efficiency can be further deteriorated.

Moreover, in the optical transmission apparatus 10, if the number of the light pipes 30 increases, from the viewpoint of miniaturization of the apparatus, it is conceivable that intervals between the light pipes 30 become narrow. As the interval between the light pipes 30 becomes narrower, it becomes more likely that lights leaked from the adjacent light pipes 30 interfere with each other. Such interference of light is undesirable because it causes deterioration of visibility of light.

Furthermore, in the optical transmission apparatus 10, because the adjacent light pipes 30 are joined through the joint unit 31, lights leaked from the adjacent light pipes 30 through the joint unit 31 can interfere with each other.

Figure 1:
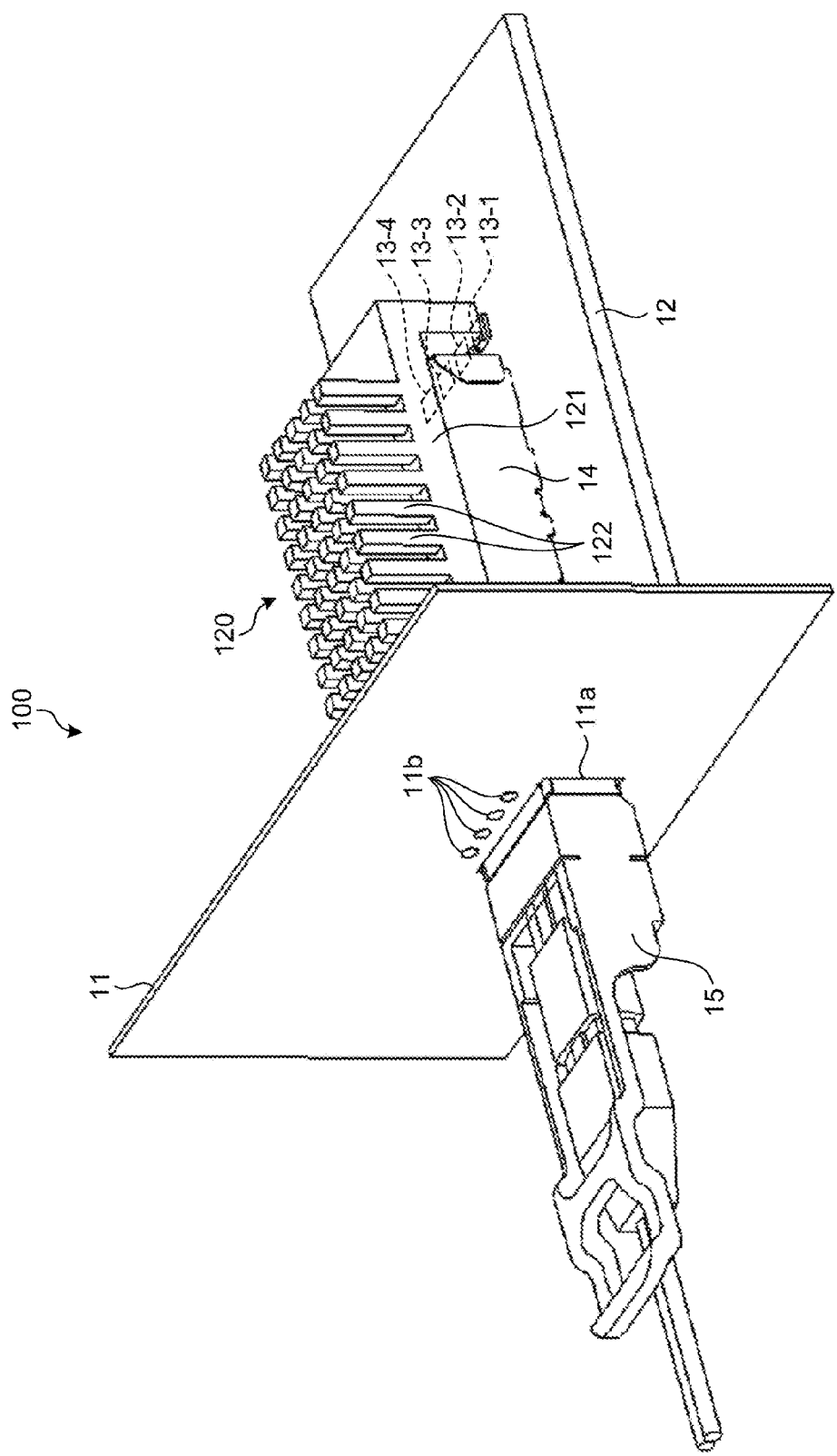
FIG. 1 depicts one example of an internal configuration of an optical transmission apparatus of a first embodiment.
Figure 2A:
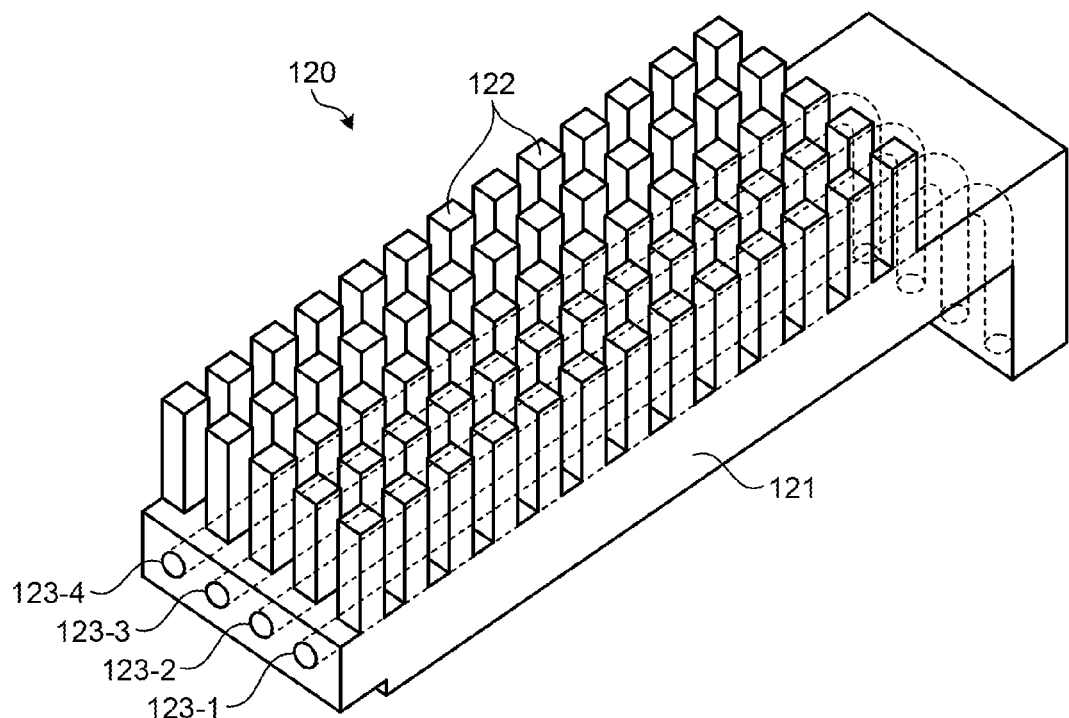
FIG. 2A is a perspective view of a heatsink of the first embodiment viewed from a fin portion side.
Figure 2B:
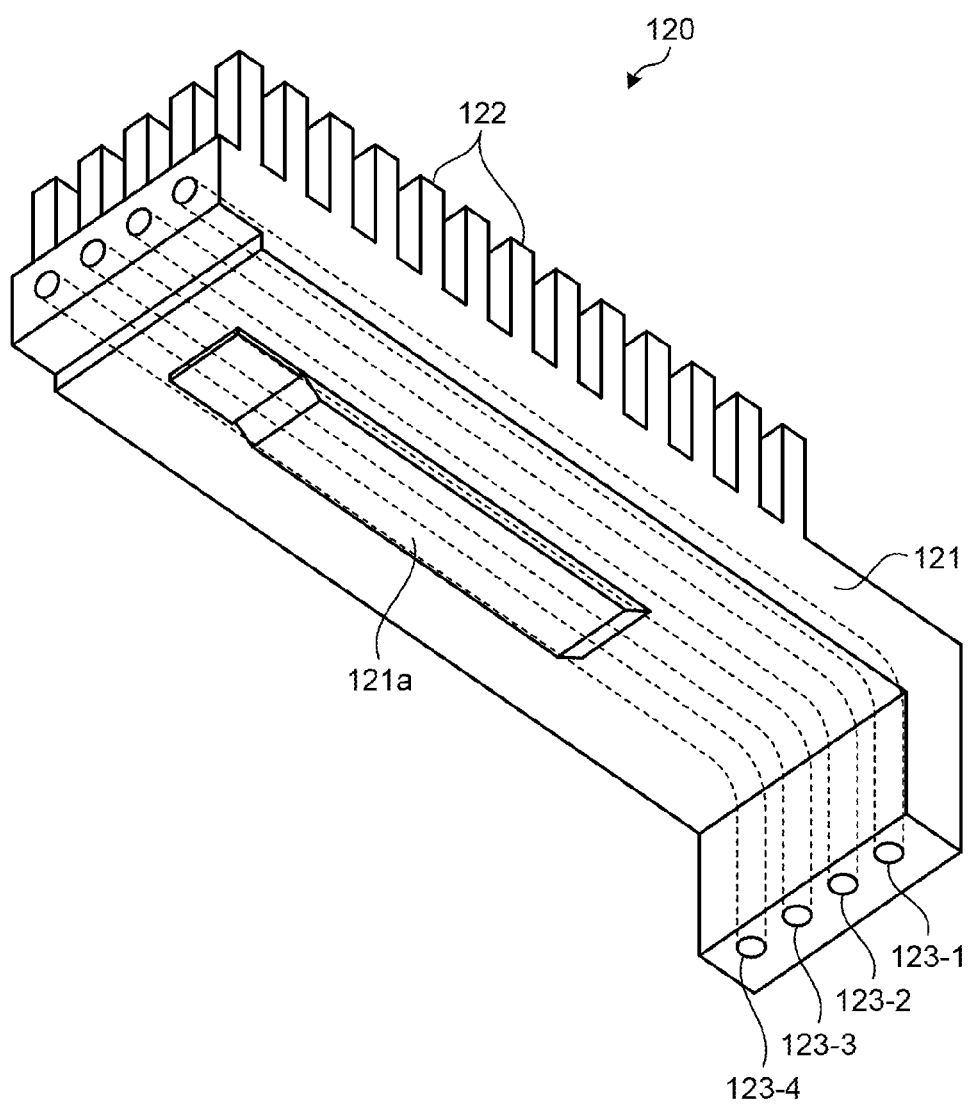
FIG. 2B is a perspective view of the heatsink of the first embodiment viewed from a base portion side.

Next, an optical transmission apparatus of a first embodiment is explained. In the following explanation, to components similar to components that have been explained, reference symbols same as those of the components that have been explained are given, and detailed explanation thereof is omitted. FIG. 1 depicts one example of an internal configuration of the optical transmission apparatus of the first embodiment. FIG. 2A is a perspective view of a heatsink of the first embodiment viewed from a fin portion side. FIG. 2B is a perspective view of the heatsink of the first embodiment viewed from a base portion side. In FIG. 1, an internal configuration of an optical transmission apparatus 100 when one pluggable module 15 is inserted to the insertion slot 11a of the casing 11 is explained as an example.

As depicted in FIG. 1, the optical transmission apparatus 100 includes the substrate 12 housed in the casing 11 and a heatsink 120.

On the substrate 12, the multiple light sources 13 (13-1 to 13-4) are mounted. Although the number of the light sources 13 is four in this example, the number of the light sources 13 is not limited thereto. Each of the light sources 13-1 to 13-4 emits light indicating various kinds of conditions of the optical transmission apparatus 100. In the following, when the light sources 13-1 to 13-4 are not particularly distinguished, these light source 13-1 to 13-4 may be called light source 13 collectively. Similarly, other components may be called collectively.

Furthermore, on the substrate 12, the cage 14 is mounted. The cage 14 basically corresponds to the cage 14 depicted in FIG. 12. The cage 14 further includes an opening (not illustrated) that is arranged in a region on which a base portion 121 described later of the heatsink 120 is arranged on a surface on an opposite side to the substrate 12, and from which the pluggable module 15 is exposed in a state in which the pluggable module 15 is inserted in the cage 14.

The heatsink 120 includes a base portion 121, fin portions 122, and light guiding paths 123-1 to 123-4 as depicted in FIG. 1, FIG. 2A, and FIG. 2B.

The base portion 21 is arranged on a surface on an opposite side to the substrate 12 of the cage 14. The base portion 121 is formed with a material having a light shielding property and heat conductivity. As a material having a light shielding property and heat conductivity, for example, metal such as aluminum, copper, stainless steel, and magnesium is used. The base portion 121 is bent toward the light sources 13 from the surface on the opposite side to the substrate 12 of the cage 14.

Moreover, the base portion 121 includes an abutting portion 121a. The abutting portion 121a abuts on the pluggable module 15 through the opening (not illustrated) of the cage 14 in a state in which the pluggable module 15 is inserted in the cage 14. Thus, the heatsink 120 can be in contact also with the pluggable module 15 not only with the cage 14, and therefore, can absorb heat generated from the pluggable module 15 efficiently through the abutting portion 121a. Furthermore, the abutting portion 121a may be formed into a shape having elasticity, such as a blade spring shape. Thus, the adhesion between the heatsink 120 and the pluggable module 15 is improved. Accordingly, the heatsink 120 can absorb heat generated from the pluggable module 15 efficiently through the abutting portion 121a.

The fin portions 122 are arranged so as to rise up from a surface on the opposite side to the cage 14 of the base portion 121.

The light guiding paths 123-1 to 123-4 are formed in hollow inside the base portion 121. The light guiding paths 123-1 to 123-4 guide lights emitted by the multiple light sources 13 to multiple output destinations corresponding to the multiple light sources 13, respectively. Specifically, the light guiding path 123-1 guides light emitted by the light source 13-1 to the output hole 11b of the casing 11 corresponding to the light source 13-1. Moreover, the light guiding path 123-2 guides light emitted by the light source 13-2 to the output hole 11b of the casing 11 corresponding to the light source 13-2. Furthermore, the light guiding path 123-3 guides light emitted by the light source 13-3 to the output hole 11b of the casing 11 corresponding to the light source 13-3. Moreover, the light guiding path 123-4 guides light emitted by the light source 13-4 to the output hole 11b of the casing 11 corresponding to the light source 13-4. Thus, the heatsink 120 can guide lights emitted by the multiple light sources 13 to the output destinations corresponding to the multiple light sources 13 efficiently, without using the light pipes 30 as in the precursor technique. Therefore, the disturbance of air by the light pipes 30 is eliminated, and the reduction in the number of the fin portions 122 does not occur, and further, leakage of light from the adjacent light pipes 30 is prevented. As a result, interference of light can be prevented while suppressing deterioration of the heat dissipation efficiency in the optical transmission apparatus 100.

Furthermore, on walls that surrounds each of a light guiding paths 123 inside the base portion 121, a reflecting portion that reflects light is formed. The reflecting portion is formed, for example, by applying mirror-finish processing or plating. Thus, light is totally reflected in the light guiding paths 123, and therefore, the light guiding property of the light guiding paths 123 can be improved.

Moreover, the light guiding paths 123 are formed in a region other than the region corresponding to the fin portions 122 in the inside of the base portion 121. Thus, the light guiding path 123 do not disturb flow of heat to the fin portions 122, and therefore, the heatsink 120 can conduct heat that has been generated from the pluggable module 15 and that has been conducted to the cage 14, efficiently to the fin portions 122 through the base portion 121.

Furthermore, the light guiding paths 123 are bent inside the base portion 121 toward the light sources 13 together with the base portion 121. Thus, one end of the multiple light guiding paths 123 can be brought close to the light sources 13, and therefore, lights emitted by the light sources 13 can be efficiently input to the light guiding paths 123.

Figure 3:
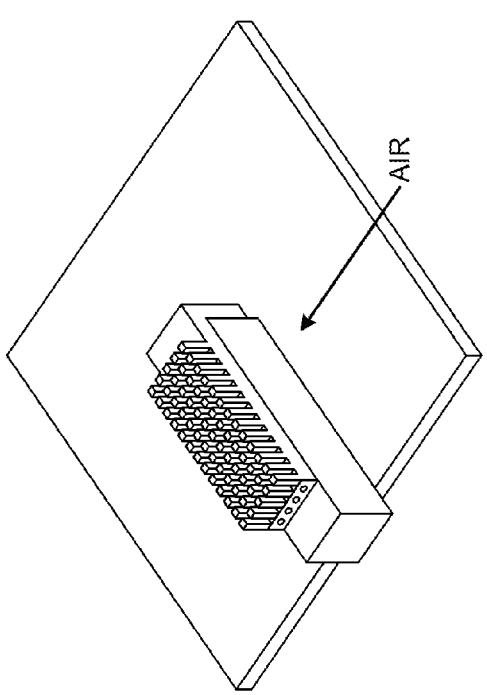
FIG. 3 is a diagram for explaining a simulation result of heat dissipation efficiency of the optical transmission apparatus of the first embodiment.

Next, a simulation result of the heat dissipation efficiency when cooling air is applied to the optical transmission apparatus of the first embodiment is explained. FIG. 3 is a diagram for explaining a simulation result of the heat dissipation efficiency of the optical transmission apparatus of the first embodiment. In FIG. 3, "model" indicates a simulation model of each of the first embodiment and a first comparison example, and "result" indicates a simulation result of each of the first embodiment and the first comparison example. The simulation model of the first comparison example corresponds to the optical transmission apparatus 10 of the precursor technique, and the simulation model of the first embodiment corresponds to the optical transmission apparatus 100 of the first embodiment. The simulation model of the first comparison example includes the heatsink 20, and the four light pipes 30, and the simulation model of the first embodiment includes the four light guiding paths 123 that are formed in the base portion 121 of the heatsink 120.

As simulation conditions, a cooling air speed: 1 [m/s], an ambient temperature: 55[° C.], and a quantity of heat: 1.5 [W] are applied. Moreover, other simulation conditions such as the number of the fin portions, are common between the first comparison example and the first embodiment.

As indicated in FIG. 3, in the first comparison example having the light pipes 30, the temperature of the heat generating part was 60.6[° C.].

On the other hand, in the first embodiment having the light guiding paths 123 formed in the base portion 121 of the heatsink 120, the temperature of the heat generating part was 60.2[° C.].

As can be seen from the above simulation results, in the first embodiment using the light guiding paths 123, the temperature of the heat generating part was lowered by 0.4[° C.] compared to the first comparison example using the light pipes 30. That is, it was found that according to the optical transmission apparatus 100 of the first embodiment, deterioration of the heat dissipation efficiency can be suppressed.

As described above, the optical transmission apparatus 100 of the first embodiment includes the heatsink 120 having the multiple light guiding paths 123 that guide lights emitted by the multiple light sources 13 to the multiple output destinations corresponding to the multiple light sources 13, respectively. Thus, lights emitted from the multiple light sources 13 can be guided to the output destinations corresponding to the multiple light sources 13 efficiently, without using the light pipes 30 of the precursor technique. Therefore, the disturbance of air by the light pipes 30, and the reduction in the number of the fin portions 122 does not occur, and further, leakage of light from the adjacent light pipes 30 is prevented. As a result, interference of light can be prevented while suppressing deterioration of the heat dissipation efficiency in the optical transmission apparatus 100.

[b] Second Embodiment

An optical transmission apparatus of a second embodiment differs from the first embodiment only in a point that the heatsink 120 is divided, and the other components are the same as the first embodiment. Therefore, in the following, the same reference symbols are given to the components same as the first embodiment, and explanation thereof is omitted.

Figure 4A:
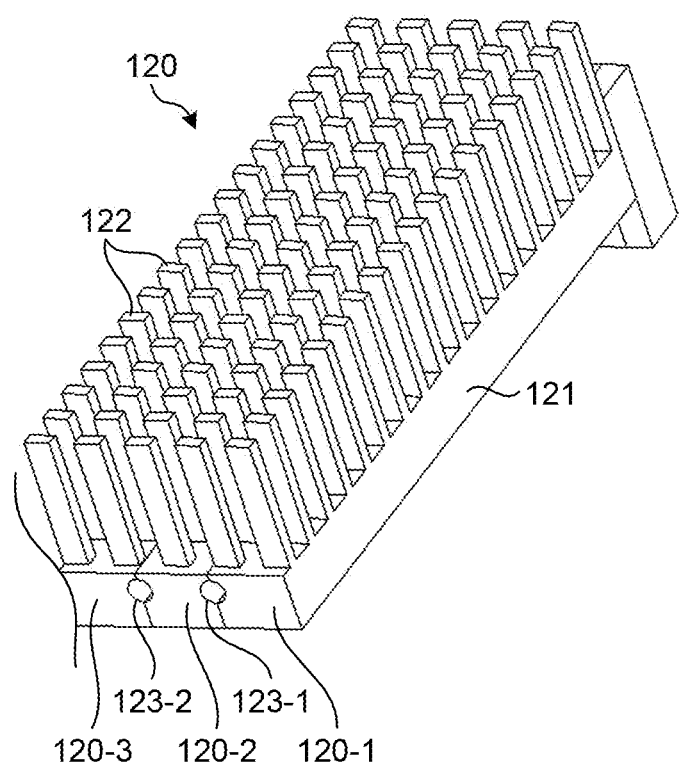
FIG. 4A is a perspective view depicting an external view of a heatsink of a second embodiment in an assembled state.
Figure 4B:
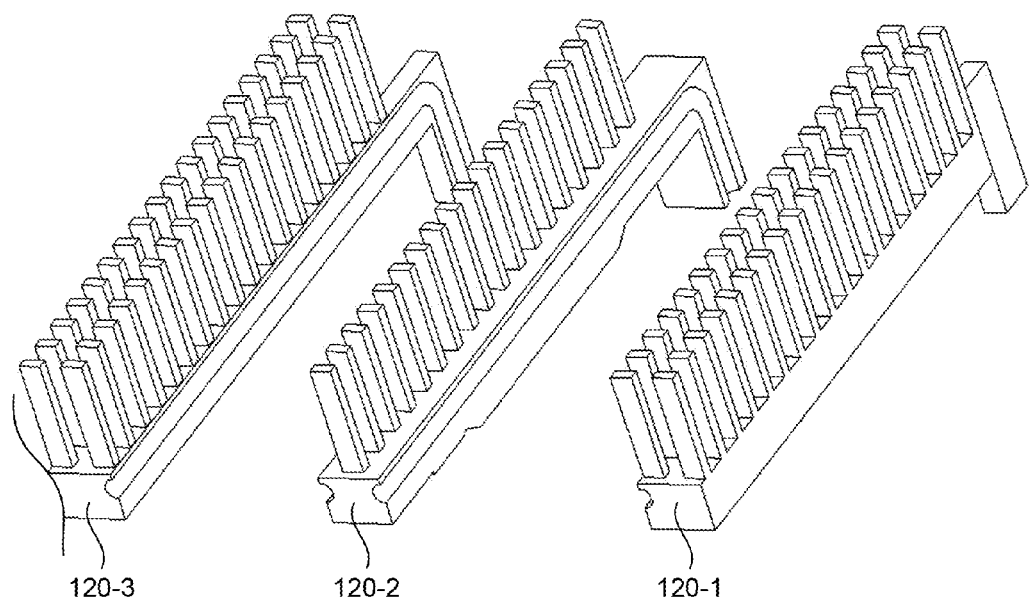
FIG. 4B is a perspective view depicting an external view of the heatsink of the second embodiment in a disassembled state.

FIG. 4A is a perspective view depicting an external view of a heatsink of the second embodiment in an assembled state. FIG. 4B is a perspective view depicting an external view of the heatsink of the second embodiment in a disassembled state. In FIG. 4A, for convenience of explanation, only two light guiding paths (the light guiding paths 123-1, 123-2) are illustrated as the multiple light guiding paths 123, and illustration of the other light guiding paths is omitted.

As depicted in FIG. 4A and FIG. 4B, the heatsink 120 of the second embodiment is divided into multiple division units (division unit 120-1 to 120-3) along a plane including at least a part of a center axis of each of the multiple light guiding paths 123, or a plane parallel to a part thereof. In the present embodiment, as the plane including at least a part of a center axis of each of the multiple light guiding paths 123, or a plane parallel to a part thereof, a vertical plane including the center axis of each of the light guiding paths 123 is used. In addition thereto, as the plane including at least a part of a center axis of each of the multiple light guiding paths 123, or a plane parallel to a part thereof, a horizontal plane, or the like including at least a part of the center axis of each of the light guiding paths 123 or a plane parallel to a part thereof can be used.

The heatsink 120 is assembled by joining the division units 120-1 to 120-3 together. Each of the multiple light guiding paths 123 is formed inside the base portion 121 when the division units 120-1 to 120-3 are joined together. Specifically, the light guiding path 123-1 is formed inside the base portion 121 when the division unit 120-1 and the division unit 120-2 are joined to each other. Moreover, the light guiding path 123-2 is formed inside the base portion 121 when the division unit 120-2 and the division unit 120-3 are joined to each other.

As described above, in the optical transmission apparatus of the second embodiment, the heatsink 120 is divided into multiple division units, and is assembled by joining the multiple division units together. Each of the multiple light guiding paths 123 is formed inside the base portion 121 when the multiple division units are joined together. Thus, the multiple light guiding paths 123 can be formed easily by joining the multiple division units, and therefore, the manufacturing of the heatsink 120 can be facilitated. Furthermore, because the heatsink 120 can be manufactured without using a molding die to mold an entire form of the heatsink 120 into one piece, increase of manufacturing cost can be suppressed.

Application Example

Although in the above second embodiment, an example in which the heatsink 120 is assembled by joining three division units (the division units 120-1 to 120-3) has been exemplified, the number of division units is not limited thereto. The number of division units may be four or more. In the following, an example in which the heatsink 120 is assembled by joining four or more division units is explained as an application example.

FIG. 5 depicts an application example of the heatsink of the second embodiment. The heatsink 120 depicted in FIG. 5 is assembled by joining nine division units 120-2 together. Thus, the heatsink 120 corresponding to multiple heat generating parts can be assembled. IN the example depicted in FIG. 5, the heatsink 120 that corresponds to three units of the cages 14 as the multiple heat generating parts.

[c] Third Embodiment

An optical transmission apparatus of a third embodiment differs from the first embodiment only in a point that multiple light-guiding path groups that are formed separately from each other, and the other components are the same as the first embodiment. Therefore, in the following, the same reference symbols are given to the components same as the first embodiment, and explanation thereof is omitted.

Figure 6A:
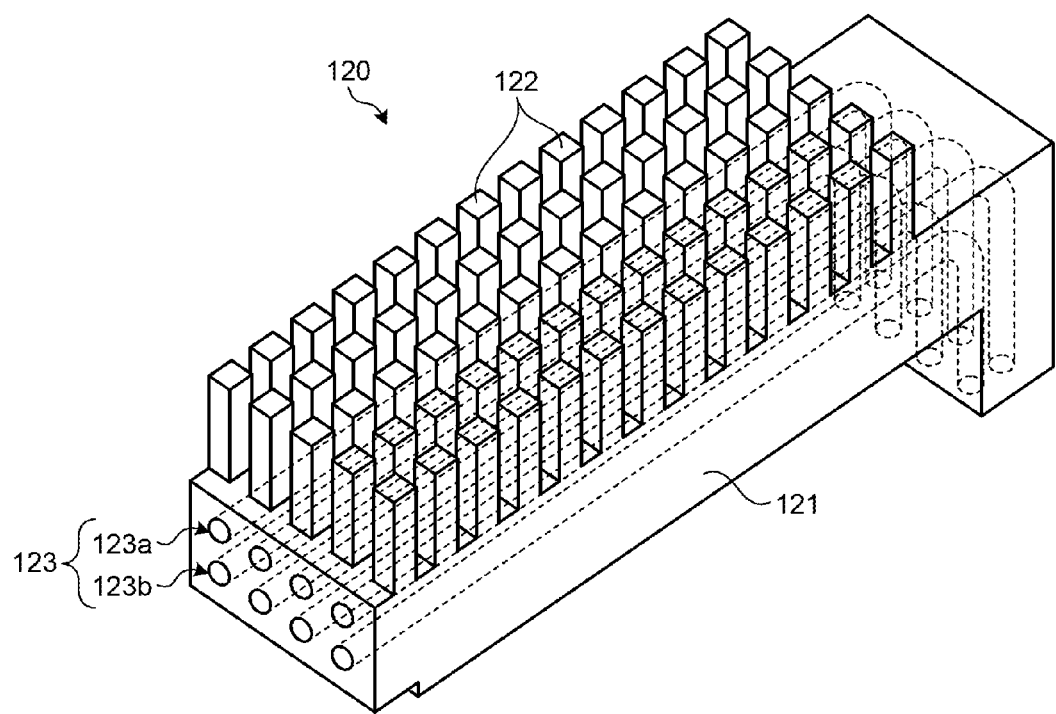
FIG. 6A is a perspective view of a heatsink of a third embodiment viewed from a fin portion side.
Figure 6B:
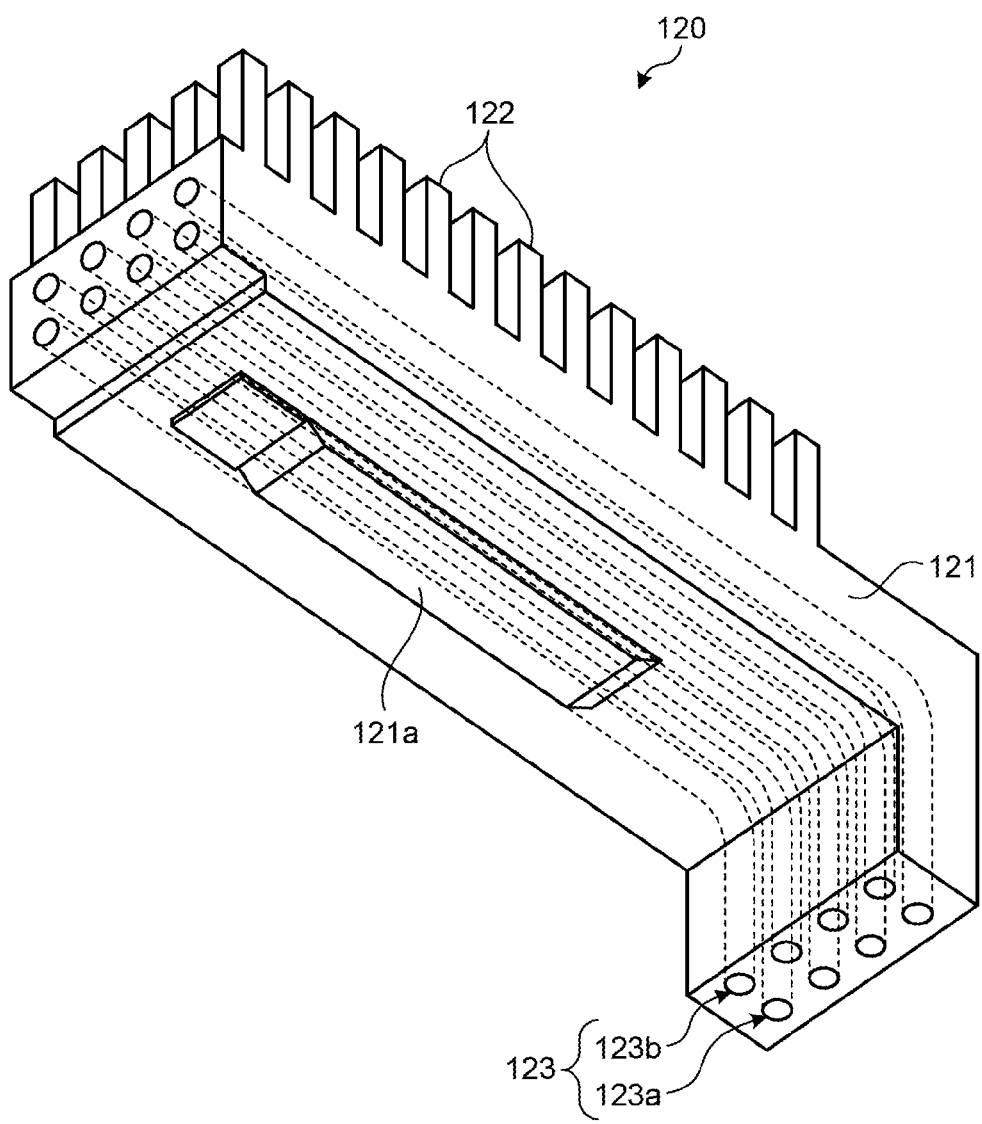
FIG. 6B is a perspective view of the heatsink of the third embodiment viewed from a base portion side.

FIG. 6A is a perspective view of a heatsink of a third embodiment viewed from a fin portion side. FIG. 6B is a perspective view of the heatsink of the third embodiment viewed from a base portion side.

As depicted in FIG. 6A and FIG. 6B, the heatsink 120 of the third embodiment includes the base portion 121, the fin portions 122, and the multiple light guiding paths 123.

The multiple light guiding paths 123 includes a first light-guiding path group 123a and a second light-guiding path group 123b. The first light-guiding path group 123a and the second light-guiding path group 123b are formed separately from each other in a region inside the base portion 121 along a thickness direction of the base portion 121. Specifically, the first light-guiding path group 123a and the second light-guiding path group 123b are formed in the region inside the base portion 121 so as to be overlapped with each other when viewed from the thickness direction of the base portion 121.

As described above, in the optical transmission apparatus of the third embodiment, the multiple light guiding paths 123 includes the first light-guiding path group 123a and the second light-guiding path group 123b that are formed separately from each other in the region inside the base portion 121 along the thickness direction of the base portion 121. Thus, the number of the light guiding paths 123 can be flexibly adjusted along the thickness direction of the base portion 121, and therefore, lights emitted by more number of the light sources 13 can be guided efficiently to corresponding output destinations by the first light-guiding path group 123a and the second light-guiding path group 123b.

Although in the above explanation, an example in which the first light-guiding path group 123a and the second light-guiding path group 123b are formed in the region inside the base portion 121 so as to overlap with each other when viewed in the thickness direction of the base portion 121 has been described, the disclosed technique is not limited thereto. Specifically, the first light-guiding path group 123a and the second light-guiding path group 123b may be formed in a region inside the base portion 121 so as not to overlap with each other when viewed from the thickness direction of the base portion 121. By forming the first light-guiding path group 123a and the second light-guiding path group 123b so as not to overlap with each other in the region inside the base portion 121, increase in the thickness of the base portion 121 can be suppressed.

[d] Fourth Embodiment

An optical transmission apparatus of a fourth embodiment differs from the third embodiment only in a point that a material having higher refractive index than that in a vacuum is filled in the multiple light guiding paths 123, and the other components are the same as the third embodiment. Therefore, in the following, the same reference symbols are given to the components same as the third embodiment, and explanation thereof is omitted.

Figure 7A:
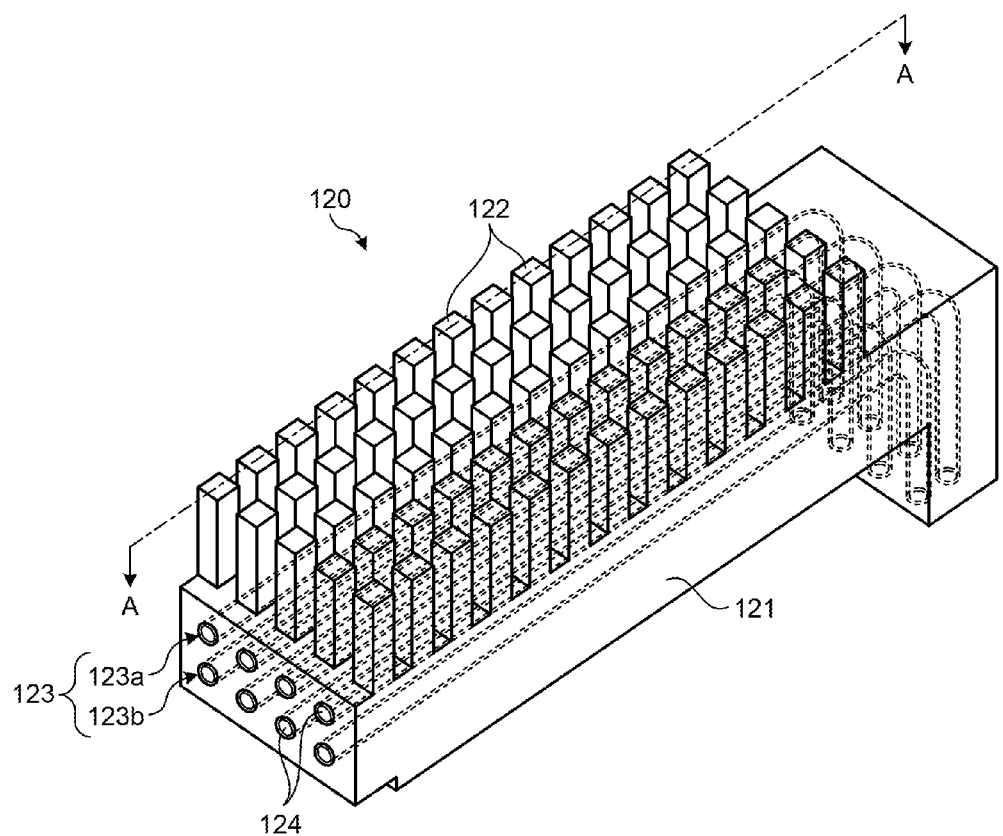
FIG. 7A is a perspective view of a heatsink of a fourth embodiment viewed from a fin portion side.
Figure 7B:
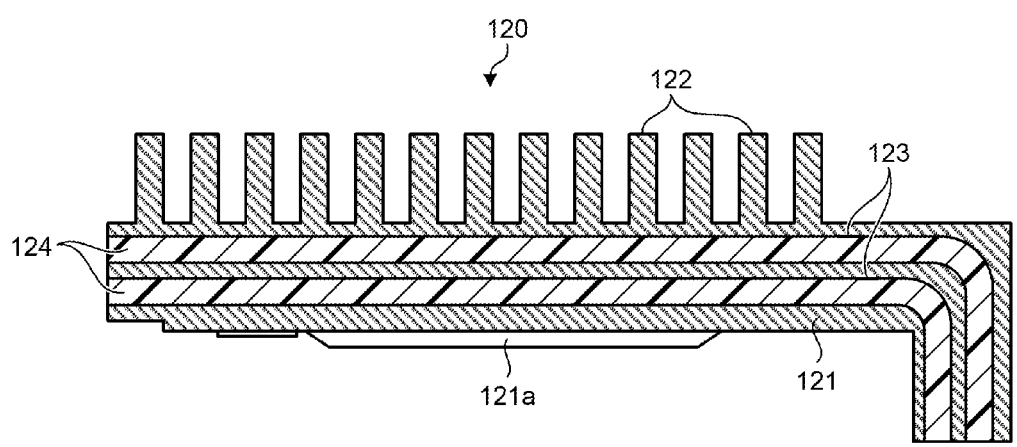
FIG. 7B is a cross-section of the heatsink depicted in FIG. 7A taken along a line A-A.

FIG. 7A is a perspective view of a heatsink of a fourth embodiment viewed from a fin portion side. FIG. 7B is a cross-section of the heatsink depicted in FIG. 7A taken along a line A-A. As depicted in FIG. 7A and FIG. 7B, in the heatsink 120 of the fourth embodiment, a material 124 having higher refractive index than that of a vacuum is filled in the light guiding paths 123. As the material 124, for example, clear transparent resin, or the like is used.

As described, in the optical transmission apparatus of the fourth embodiment, the material having higher refractive index than that of a vacuum is filled in the multiple light guiding paths 123. Thus, propagation of light is promoted by the material 124 in the multiple light guiding paths 123, and therefore, the light guiding property of the multiple light guiding paths 123 can be improved.

[e] Fifth Embodiment

An optical transmission apparatus of a fifth embodiment differs from the third embodiment only in a point that optical fibers are inserted in the multiple light guiding paths 123, and the other components are the same as the third embodiment. Therefore, in the following, the same reference symbols are given to the components same as the third embodiment, and explanation thereof is omitted.

Figure 8A:
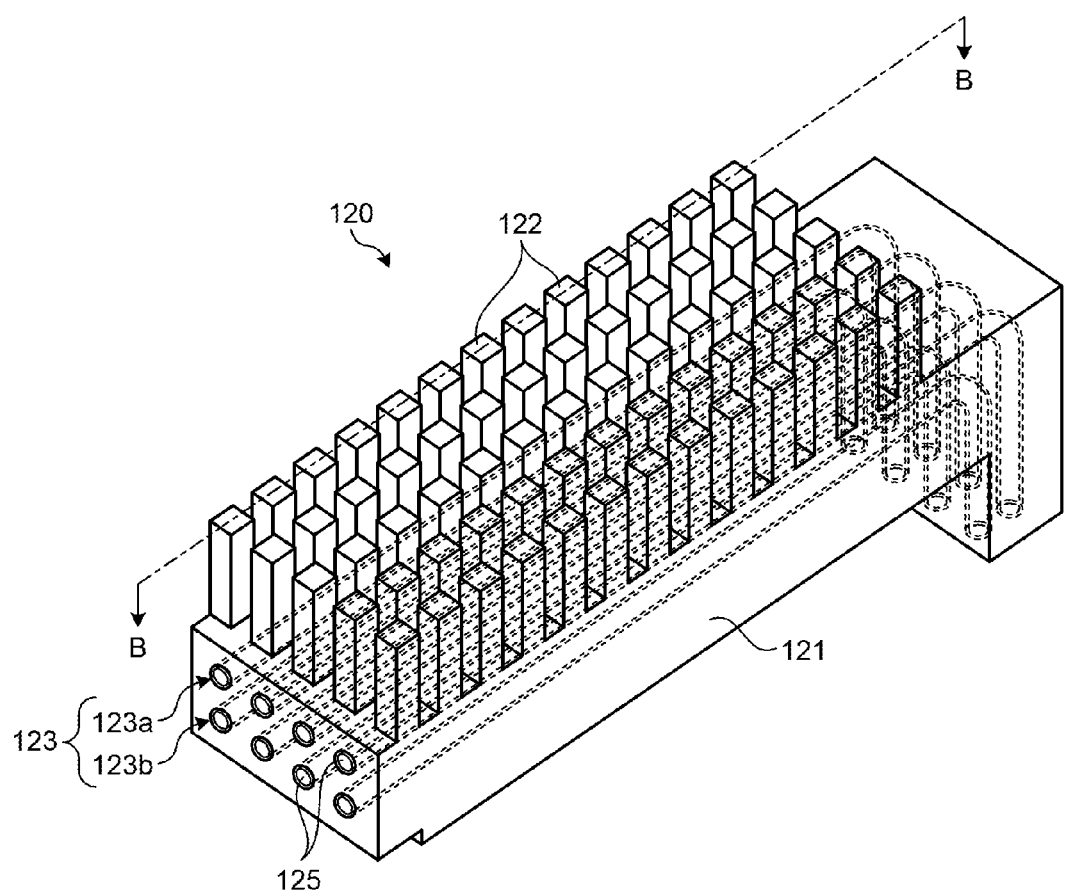
FIG. 8A is a perspective view of a heatsink of a fifth embodiment viewed from a fin portion side.
Figure 8B:
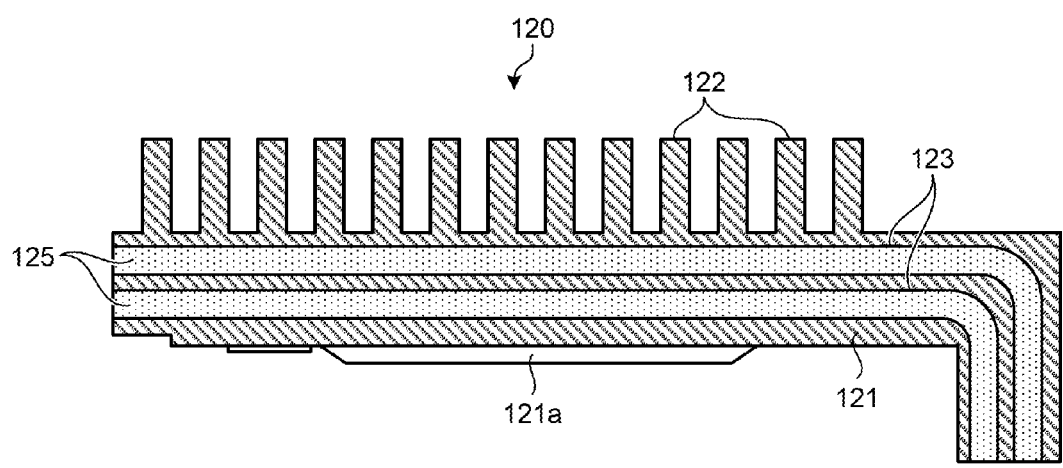
FIG. 8B is a cross-section of the heatsink depicted in FIG. 8A taken along a line B-B.

FIG. 8A is a perspective view of a heatsink of the fifth embodiment viewed from a fin portion side. FIG. 8B is a cross-section of the heatsink depicted in FIG. 8A taken along a line B-B. As depicted in FIG. 8A and FIG. 8B, in the heatsink 120 of the fifth embodiment, optical fibers 125 are inserted in the light guiding paths 123. As the optical fibers 125, for example, various kinds of optical fibers, such as a plastic optical fiber and a glass optical fiber, are used.

As described above, in the optical transmission apparatus of the fifth embodiment, the optical fibers 125 are inserted in the multiple light guiding paths 123. Thus, propagation of light is promoted by the optical fibers 125 in the multiple light guiding paths 123, and therefore, the light guiding property of the light guiding paths 123 can be improved.

[f] Sixth Embodiment

An optical transmission apparatus of a sixth embodiment differs from the third embodiment only in a point that a lens is arranged at an end of the multiple light guiding paths 123, and the other components are the same as the third embodiment. Therefore, in the following, the same reference symbols are given to the components same as the third embodiment, and explanation thereof is omitted.

Figure 9:
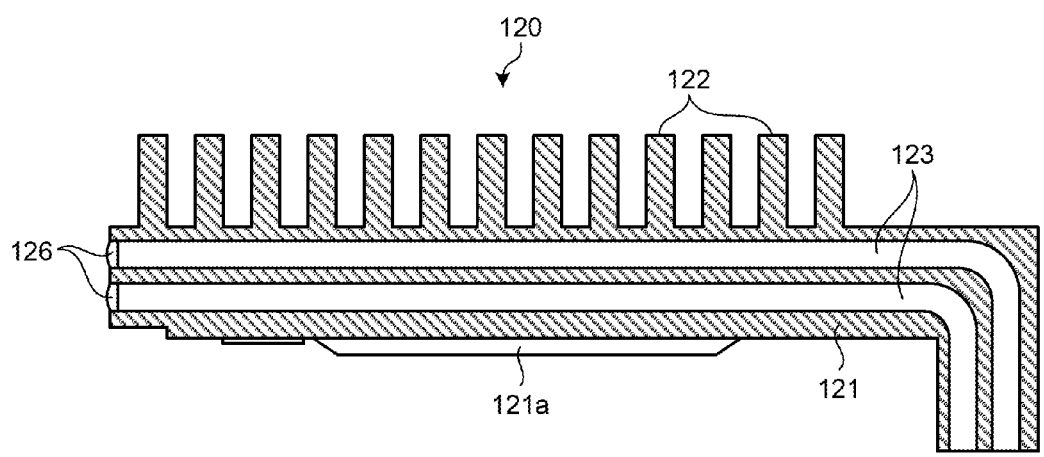
FIG. 9 is a cross-section of a heatsink of a sixth embodiment.

FIG. 9 is a cross-section of a heatsink of the sixth embodiment. As depicted in FIG. 9, in the heatsink 120 of the sixth embodiment, lenses 126 to diffuse light are arranged at an end of the multiple light guiding paths 123 opposing to the multiple output holes 11b. As the lens 126, for example, a round-shaped lens having a predetermined curvature or the like, is used.

As described above, in the optical transmission apparatus of the sixth embodiment, at the ends of the multiple light guiding paths 123 opposing to the multiple output holes 11b, the lenses 126 to diffuse light are arranged. Thus, diffused light is output from the multiple output holes 11b, and therefore, the visibility of light can be improved.

Although in the above explanation, an example in which the heat generating parts are the cage 14 and the pluggable module 15 inserted in the cage 14 has been explained, the heat generating part is not limited thereto. For example, the heat generating part may be an electronic part such as a processor and a memory mounted on the substrate 12.

Moreover, in the above explanation, the individual configuration and operation have been explained per each embodiment. However, the optical transmission apparatus according to each of the embodiments described above may have a component specific to another modification in addition thereto. Furthermore, as for combination of the respective embodiments, not limited to two, but an arbitrary form, such as combination of three or more, may be adopted. For example, in the light guiding paths 123 in the optical transmission apparatus of the first embodiment, the material 124 of the fourth embodiment, the optical fibers 125 of the fifth embodiment, or the lenses 126 of the sixth embodiment may be provided. Moreover, one optical transmission apparatus may have all of the components explained in the first to the sixth embodiments described above, within a compatible range.

According to an aspect of an optical transmission apparatus disclosed in the present application, an effect that interference of light can be prevented while suppressing deterioration of heat dissipation efficiency is produced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
a substrate on which a plurality of light sources and a heat generating part are mounted; and
a heatsink that includes a base portion that is arranged on a surface of the heat generating part on an opposite side to the substrate and that is bent toward the light sources from the surface of the heat generating part on the opposite side to the substrate to come close to the light sources without contacting the substrate, a fin portion that rises up from a surface of the base portion on an opposite side to the heat generating part, and a plurality of light guiding paths that are formed inside the base portion and that guide lights emitted by the light sources to a plurality of output destinations, respectively.

2. The optical transmission apparatus according to claim 1, wherein
on walls that surround each of the light guiding paths inside the base portion, a reflecting portion that reflects light is formed.

3. The optical transmission apparatus according to claim 1, wherein
the light guiding paths are formed in region other than a region corresponding to the fin portion, in a region inside the base portion.

4. The optical transmission apparatus according to claim 1, wherein
the heatsink is divided into a plurality of division units along any one of a plane including at least a part of a center axis of each of the light guiding paths, and a plane parallel to the part thereof, and is assembled by joining the division units.

5. The optical transmission apparatus according to claim 1, wherein
the light guiding paths includes a plurality of light-guiding path groups that are formed separately from each other along a direction of thickness of the base portion in a region inside the base portion.

6. The optical transmission apparatus according to claim 5, wherein
the light-guiding path groups are formed in a region inside the base portion so as to be overlapped with each other when viewed from the direction of thickness of the base portion.

7. The optical transmission apparatus according to claim 5, wherein
the light-guiding path groups are formed in a region inside the base portion so as not to be overlapped with each other when viewed from the direction of thickness of the base portion.

8. The optical transmission apparatus according to claim 1, wherein
a material having a refractive index higher than a refractive index of a vacuum is filled in the light guiding paths.

9. The optical transmission apparatus according to claim 1, wherein
an optical fiber is inserted in the light guiding paths.

10. The optical transmission apparatus according to claim 1, wherein
at an end of the light guiding paths opposing to the output destinations, a lens to diffuse light is arranged.

11. The optical transmission apparatus according to claim 1, wherein
the heat generating part is a module to which a optical transmission path is connected, and a cage to which the module is inserted,
the cage is formed in a region in which the base portion is arranged on a surface on an opposite side to the substrate, and includes an opening at which the module is exposed with the module inserted in the cage, and
the base portion includes an abutting portion that abuts on the module through the opening with the module inserted in the cage.

12. The optical transmission apparatus according to claim 1, wherein
the light guiding paths are bent toward the light sources together with the base portion, inside the base portion.

* * * * *